United States Patent
Iida et al.

(10) Patent No.: US 7,548,645 B2
(45) Date of Patent: Jun. 16, 2009

(54) IMAGE PROCESSOR AND IMAGE PROCESSING SYSTEM

(75) Inventors: Takayuki Iida, Kanagawa (JP); Hiroaki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 683 days.

(21) Appl. No.: 10/898,972

(22) Filed: Jul. 27, 2004

(65) Prior Publication Data
US 2005/0024498 A1 Feb. 3, 2005

(30) Foreign Application Priority Data
Jul. 28, 2003 (JP) ............................. 2003-202473

(51) Int. Cl.
G06K 9/00 (2006.01)
(52) U.S. Cl. ...................................... 382/167; 382/163
(58) Field of Classification Search .............. 382/162, 382/167, 163, 303–304; 348/207.2, 207.99
See application file for complete search history.

(56) References Cited

FOREIGN PATENT DOCUMENTS

| JP | 2001-148780 A | 5/2001 |
|----|---------------|--------|
| JP | 2001-275066 A | 10/2001 |
| JP | 2003-179807 A | 6/2003 |

*Primary Examiner*—Duy M Dang
(74) *Attorney, Agent, or Firm*—Sughrue Mion, PLLC

(57) ABSTRACT

The image processor is connected to an image output apparatus or an image input apparatus, and has an image processing unit which performs predetermined image processing on image data using photographing information, a preprocessing unit which performs preprocessing on the image data, and a determination unit which determines whether the image output apparatus and the image input apparatus include the image processing unit or not. When the image output apparatus and the image input apparatus do not include the image processing unit, the determination unit determines that the image processor performs the preprocessing and the image processing. The image processing system has two image processors equipped with an image input function and an image output function, respectively.

3 Claims, 7 Drawing Sheets

IMAGE PROCESSOR AND IMAGE PROCESSING SYSTEM

BACKGROUND OF THE INVENTION

The present invention relates to an image processor and an image processing system. More particularly, the invention relates to an image processing technology capable of efficient red-eye correction in so-called direct printing in an image processor which receives image data from an image input apparatus, an image processor connected to an image output apparatus, or an image processing system composed of a combination of these processors.

Conventionally, printing of an image photographed on a photographic film such as a negative film or a reversal film on a photosensitive material (printing paper) is performed by so-called direct exposure in which an image on a film is projected onto a photosensitive material.

In recent years, a digital photo printer has been commercialized. In the digital photo printer, the image recorded on a film is read photoelectrically and converted to digital signals or digital image data is captured with a digital camera; the digital signals or the digital image data is subjected to various image processing operations (digital processing) to produce image data for recording purposes; recording light that has been modulated in accordance with the image data is used to expose a photosensitive material and the exposed photosensitive material is output as a print.

Such image processing based on digital (signal) processing makes it possible to correct colors and densities advantageously and to perform image processing that has been basically impossible to achieve by the conventional direct exposure, as exemplified by gradation correction and sharpening (sharpness enhancement). A high-quality image can be thus obtained.

The most important factor which determines the quality in a photograph of a person-containing image such as a portrait is how the person is finished. Thus, the red-eye effect or appearance of red eyes (pupils) on a photograph caused by flash photography considerably degrades the quality of the photograph and presents a problem.

The red-eye effect often occurs when a person is photographed by using an electronic flash from the front especially in a dark place or in the nighttime. The red-eye-effect takes place in the following way: light of an electronic flash impinges on eyes of a person with pupils open from the front in a dark place, and the electronic flash light is regularly reflected, which state appears in the image. The red-eye effect includes red-eye where pupils are red and gold-eye where pupils are gold. In the following description, red-eye refers to both cases.

In order to suppress the red-eye effect, a camera having a preliminary flash-firing function has been developed in which an electronic flash is preliminarily fired prior to photographing to reduce the opening of the pupils which may cause red-eye effect and thereafter electronic flash photography is performed. However, preliminary firing of an electronic flash cannot always prevent red-eye from occurring depending on the personal differences between subject persons and differences between photographing conditions.

There have also been proposed various methods with which a red-eye image is corrected by the digital image processing as described above to produce an image free from red-eye.

For example, a red-eye correction method is known in which red pupils are converted to pupils of a predetermined color in an image in which red-eye occurred at the time of photographing, by setting the area of red-eye correction through automatic extraction of only red eyes from the region containing red eyes as specified by an operator, or in the case where the automatic extraction of only red eyes is not possible, setting the area of red-eye correction through manual designation of only red eyes by the operator. (for example refer to JP 2001-148780 A).

Another method is also known in which a preliminary image photographed with preliminary firing of an electronic flash is compared with an image photographed with subsequent firing of an electronic flash to detect red-eye in the latter image and the detected red-eye is corrected through conversion to have a predetermined hue, thereby automatically performing red-eye correction in a digital camera (for example, refer to JP 2003-179807 A).

Conventionally, when an image photographed with a digital camera was to be printed, the image data was transferred to a personal computer (PC), where the image data was converted to a printing format suitable for a printer used and sent to the printer for the subsequent printing.

In recent years however, so-called direct printing becomes popular in which image data is directly transferred from a digital camera to a printer without using a PC and is processed and output as a print in the printer. There is well known a system in which, in direct printing using an image supply device such as a digital camera and a printing device such as a printer, image processing is adaptively shared between the devices in accordance with the throughput, data size and data transfer speed per image processing function of each device, in order to perform efficient direct printing (for example, refer to JP 2001-275066 A).

It is also desirable to output a red-eye-corrected, high-quality print as described above in such a direct printing.

However, the conventional red-eye correction methods described in JP 2001-148780 A and JP 2003-179807 A do not support direct printing but requires manual operation by an operator or PC-based processing. In the case where these methods are used in an image processing system performing direct printing, the processing efficiency is not always high.

Although the method described in JP 2001-275066 A shares image processing between devices in direct printing, this document does not disclose specifically how to perform red-eye correction in direct printing.

In any way, it seems that direct printing in which image data can be directly transmitted from a digital camera to a printer without using a PC to quickly perform printing becomes more popular and it has been desired for red-eye correction to be performed more efficiently also in direct printing.

SUMMARY OF THE INVENTION

The invention has been accomplished in view of the aforementioned prior art problems and has as an object to provide an image processor and an image processing system which are capable of efficiently performing red-eye correction for example in so-called direct printing in which image data is directly transmitted from a digital camera to a printer without using a PC and is subjected to printing.

In order to attain the above-described object, the first aspect of the present invention provides an image processor connected to an image output apparatus, comprising image processing means for performing predetermined image processing on image data using photographing information when photographing to acquire the image data, preprocessing means for performing preprocessing of the predetermined image processing on the image data, and determination means for determining whether the image output apparatus comprises the image processing means or not, wherein the determination means determines that the image processor performs the preprocessing and the predetermined image processing, when the image output apparatus does not comprise the image processing means.

Preferably, the predetermined image processing is red-eye correction processing and the preprocessing is processing for selecting image data of an image which is expected to include red-eye from the image data.

Also, in order to attain the above-described object, the second aspect of the present invention provides an image processor which receives image data from an image input apparatus, comprising image processing means for performing predetermined image processing on the image data using photographing information when photographing to acquire the image data, preprocessing means for performing preprocessing of the predetermined image processing on the image data, and determination means for determining whether the image input apparatus comprises the image processing means or not, wherein the determination means determines that the image processor performs the preprocessing and the predetermined image processing, when the image input apparatus does not comprise the image processing means.

Preferably, the predetermined image processing is red-eye correction processing and the preprocessing is processing for selecting image data of an image which is expected to include red-eye from the image data.

Further, in order to attain the above-described object, the third aspect of the present invention provides an image processing system comprising a first image processor equipped with an image input function, and a second image processor equipped with an image output function, wherein both of the first image processor and the second image processor can transfer image data to each other and comprise image processing means for performing predetermined image processing on the image data using photographing information when photographing to acquire the image data, and at least one of the first image processor and the second image processor comprises means for determining the sharing of the preprocessing and the predetermined image processing between the first image processor and the second image processor.

Preferably, the predetermined image processing is red-eye correction processing and the preprocessing is processing for selecting image data of an image which is expected to include red-eye from the image data.

This application claims priority on Japanese patent application No.2003-202473, the entire contents of which are hereby incorporated by reference.

DETAILED DESCRIPTION OF THE INVENTION

The image processor and the image processing system according to the invention are described below with reference to preferable embodiments shown in the attached drawing.

Figure 1:
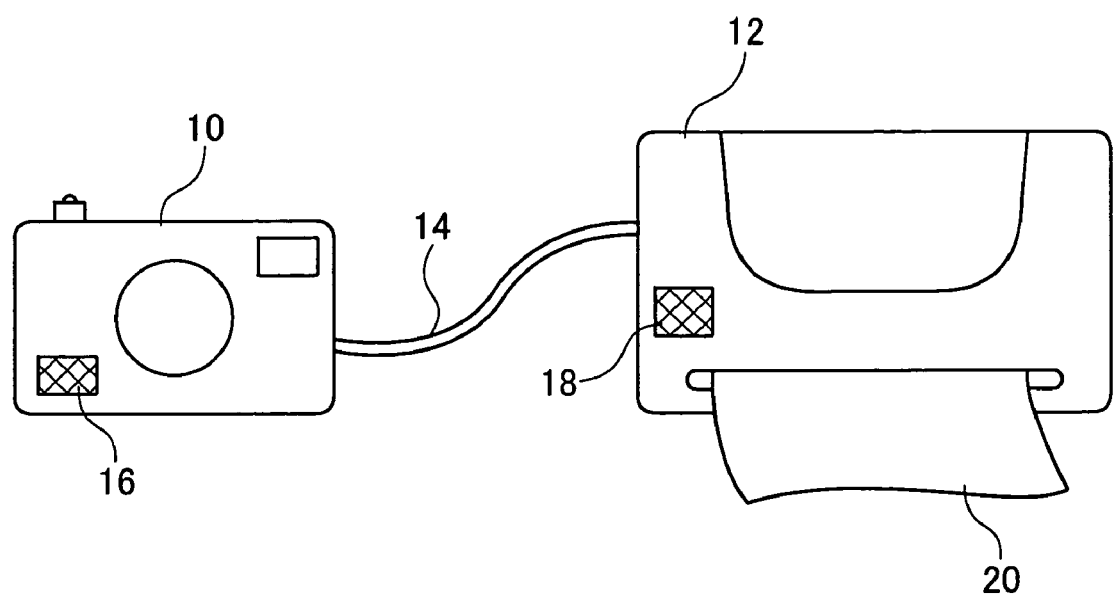
FIG. 1 is a diagram schematically showing the structure of an image processing system according to a first embodiment of the invention that includes an image processor according to the invention.

FIG. 1 is a diagram schematically showing the structure of an image processing system according to a first embodiment of the invention that includes an image processor according to the invention.

As shown in FIG. 1, the image processing system is a direct printing system where a digital camera 10 and a printer 12 are interconnected via a serial bus 14.

The digital camera 10 includes an image processing chip 16 where image processing software for performing red-eye correction is incorporated, as image processing means for performing red-eye correction as predetermined image processing in this embodiment. Similarly, the printer 12 includes an image processing chip 18 as image processing means for performing red-eye correction.

The image processing chip 16 (or 18) is a Digital Signal Processor (DSP) where predetermined image processing software is incorporated and performs digital processing on image data at high speed.

In this embodiment, the image processing chip 16 (or 18) is preset to correct red-eye as predetermined image processing. However, image processing software may be downloaded later into the image processing chip 16 (or 18).

The image processing software to be incorporated into the image processing chip 16 (or 18) is not limited to the software for use in red-eye correction. Preferred example is ultra-high-quality digital image processing software, Image Intelligence™ available from FUJI PHOTO FILM CO., LTD.

The image processing chip 16 (or 18) may perform data processing therein but an execution program may be provided from the image processing chip 16 (or 18) to the digital camera 10 (printer 12) for execution.

The printer 12 outputs as a print 20 an image photographed with the digital camera 10 after the image has been subjected to red-eye correction by one of the image processing chips 16, 18.

The image processor connected to an image output apparatus in the first aspect of the invention refers to the digital camera 10 connected to the printer 12. The image processor which receives data from an image input apparatus in the second aspect of the invention refers to the printer 12 which receives data of an image photographed with the digital camera 10.

The first image processor having an image input function in the third aspect of the invention refers to the digital camera 10 which performs image processing on the data of a photographed image. The second image processor having an image output function refers to the printer 12 which performs image processing and outputs an image as a print 20.

Figure 2:
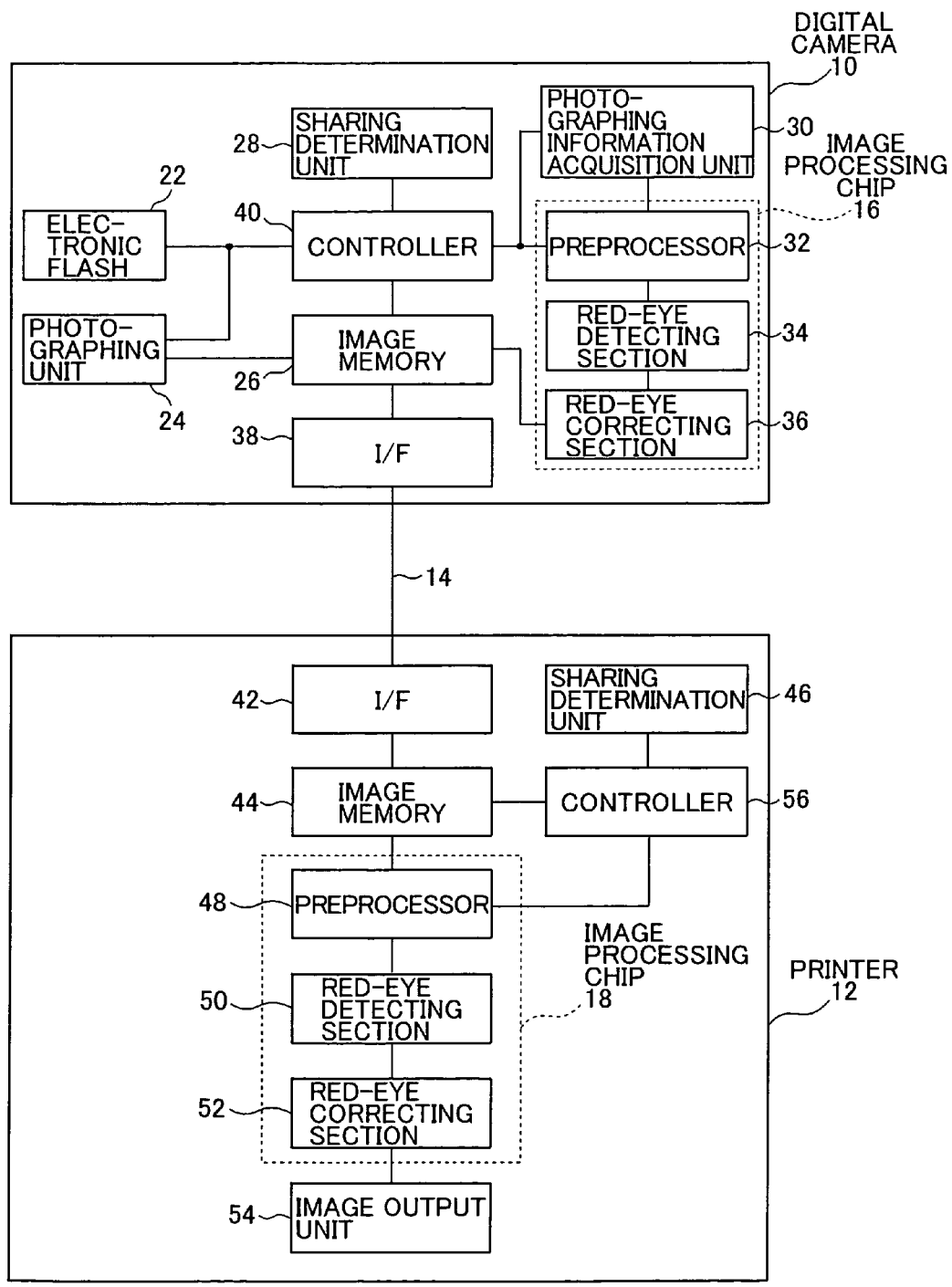
FIG. 2 is a block diagram showing the structures of a digital camera and a printer shown in FIG. 1 in further detail.

FIG. 2 is a block diagram showing the structures of the digital camera 10 and the printer 12 in further detail.

As shown in FIG. 2, the digital camera 10 of this embodiment includes an electronic flash 22, a photographing unit 24, an image memory 26 for storing data of a photographed image, a sharing determination unit 28 for determining how preprocessing and red-eye correction processing are to be shared between the image processing chips 16 and 18 when the digital camera 10 and the printer 12 have the chips 16 and 18, respectively, and a photographing information acquisition unit 30 for acquiring photographing information at the time of image photographing by the photographing unit 24. The digital camera 10 includes, in the image processing chip 16, a preprocessor 32 for performing preprocessing before red-eye correction, a red-eye detecting section 34 for detecting a red-eye region from the face of a person and a red-eye correcting section 36 for actually correcting red-eye. The digital camera 10 also includes an interface (I/F) 38 for communicating data to/from the printer 12 and a controller 40 for controlling each section of the digital camera 10.

The printer 12 includes an interface (I/F) 42 for communicating data to/from the digital camera 10, an image memory 44 for storing the image data received from the digital camera 10, and a sharing determination unit 46 for determining how preprocessing and red-eye correction processing are to be shared between the image processing chips 16 and 18 when the digital camera 10 and the printer 12 have the chips 16 and 18, respectively.

The printer 12 also includes, in the image processing chip 18, a preprocessor 48 for performing preprocessing prior to red-eye correction, a red-eye detecting section 50 and a red-eye correcting section 52. The printer 12 further includes an image output unit 54 for converting processed image data to an output format and outputting the converted data as a print 20 (refer to FIG. 1), and a controller 56 for controlling each section of the printer 12.

For the sake of simplifying the description, the digital camera 10 and the printer 12 in FIG. 2 are provided with the sharing determination units 28 and 46, respectively. However, the sharing determination units need not be arranged in both of the digital camera 10 and the printer 12 and the sharing determination unit 28 or 46 arranged in at least one of the digital camera 10 and the printer 12 will suffice.

As mentioned earlier, the sharing determination unit 28 (or 46) determines how the preprocessing and red-eye correction processing are to be shared between the image processing chips 16 and 18 when the digital camera 10 and the printer 12 have the chips 16 and 18, respectively. Sharing of the preprocessing and red-eye correction processing is determined for example as mentioned below.

Exemplary approaches are: (1) Processing is performed by selecting one of the image processing chips 16 and 18 which is capable of earlier processing than the other based on the processing state; (2) Preprocessing, red-eye detection and red-eye correction are shared between the image processing chips 16 and 18 and are performed; (3) Processing is performed by one of the processor chips which has free resources. For example, the sharing determination unit 28 acquires such information as whether the image processing chip 18 is mounted and the processing state from the printer 12 and determines how the processing is to be shared, by an appropriate combination of the above-mentioned three approaches, in consideration of the processing state, volume of data to be processed and the target processing time. Currently, the red-eye detection takes a long time, about five times as long as that of red-eye correction. Thus the sharing of processing is an important factor for smooth processing.

The photographing information acquisition unit 30 records the photographing information used in photographing of an image in the photographing unit 24 of the digital camera 10 as Exif (Exchangeable Image File Format) information in correspondence with the image data.

The preprocessor 32 selects, from the photographing information, an image (frame) which could include red-eye or is expected to include red-eye. The photographing information related to red-eye includes presence/absence of firing of an electronic flash, an Ev value (exposure value), a photographing mode, a camera model, and photographing time. Since red-eye occurs only in electronic flash photography, it is possible to exclude a non-electronic flash image or an image where red-eye never takes place, from the red-eye detection processing, by using the information on the presence/absence of firing of an electronic flash.

The Ev value is a well-known value determined based on the relationship between an f-stop number and a shutter speed assuming an f-stop number of f1 for a film of ISO 100 and EV0 when the shutter speed is 1 second. The higher the EV value is, the less the exposure will be. Generally, the more the exposure volume is, that is, the smaller the Ev value is, the more likely the red-eye is to occur. It is thus possible to assume the possibility of red-eye from the Ev value.

The normal photographing modes are portrait mode, landscape mode and night scene mode. Red-eye is most likely to occur in the portrait mode. Therefore, it is also possible to assume the possibility of red-eye from the photographing mode.

The camera model is the information on the model of the camera used to photograph an image. In recent years, digital cameras are getting more and more downsized thus the lens and an electronic flash are arranged in proximity to each other. As a result, the reflection of an electronic flash light from the retina of a person as a subject is more likely to enter the lens thus causing red-eye. It is thus possible to assume the possibility of red-eye from the camera model information also.

The photographing time is another keyword. Photographing in the nighttime is more likely to rely on electronic flash photography. It is thus possible to assume the possibility of red-eye from the time of photographing.

Actually, the determination based on a combination of several pieces of information allows the possibility of red-eye occurrence to be assumed with higher accuracy.

The red-eye detecting section 34 extracts the face of a person from the image selected by the preprocessor 32 and detects the region of the pupils in which red-eye appears. The detection method is not particularly limited but a variety of well-known methods are available.

An exemplary method involves first extracting a face by edge detection, shape pattern detection, or a face detection method based on hue extraction or skin tone extraction, and then extracting pupils from the extracted face region for example by edge detection or shape pattern detection, or using position information or hue information thereby detecting red-eye based on the saturation and hue.

Positions and number of red eyes obtained as a result of red-eye detection are attached to the image of interest for use in the subsequent red-eye correction procedure.

The red-eye correcting section 36 corrects the red-eye detected by the red-eye detecting section 34. The red-eye correction method is not particularly limited but a variety of well-known methods are available.

Exemplary methods include a method for correcting red-eye by subjecting the detected red-eye to color conversion or by reducing the saturation of the detected red-eye and a method for correcting red-eye by correcting the saturation and lightness of all the other pixels so as to reach the minimum lightness in the detected red-eye region.

The preprocessor 48, the red-eye detecting section 50 and the red-eye correcting section 52 in the image processing chip 18 on the printer 12 side are similar to the preprocessor 32, the red-eye detecting section 34 and the red-eye correcting section 36 in the image processing chip 16 on the digital camera 10 side described above.

When the image processing software for red-eye correction installed in the image processing chip 16 on the digital camera 10 side and that installed in the image processing chip 18 on the printer 12 side are different in version, the sharing determination unit 28 and 46 exchange version information so that processing can be performed using the software of the latest version. To be more precise, an execution program is loaded from the image processing chip 16 or 18 where the latest version is installed to the printer 12 or the digital camera 10. The latest version is used in the next system startup. The printer 12 also acquires the model information on the digital camera 10 where the image processing chip 16 having the software of the latest version is mounted so that the LUT for image processing can be updated.

The software of the latest version is often not appropriate for use in processing depending on the image to be processed. In such a case, inappropriate images may be selected for processing with the software of the older version.

The image output unit 54 converts an image which has undergone red-eye correction and other image processing (description thereof being omitted herein) to data for print output and outputs the converted data as a print.

Figure 3:
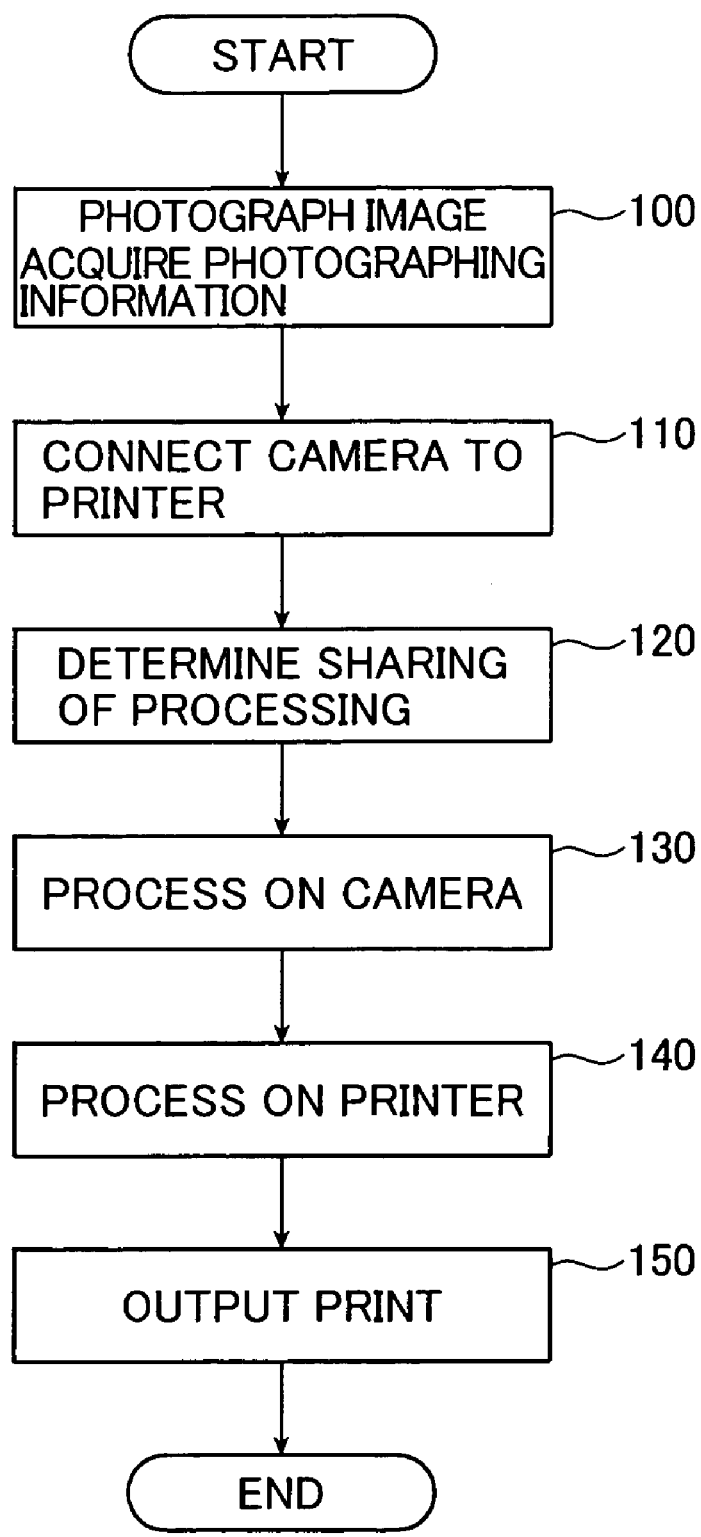
FIG. 3 is a flowchart showing the operation of the first embodiment of the invention.

FIG. 3 is a flowchart showing the operation of the first embodiment of the invention.

The operation of the first embodiment is described below referring to the flowchart of FIG. 3.

The first embodiment refers to the case where the processing is performed by sharing the red-eye processing between the image processing chips 16 and 18 mounted on the digital camera 10 and the printer 12, respectively.

In step 100 in FIG. 3, a person as a subject (not shown) is photographed with the digital camera 10. In this practice, the photographing information acquisition unit 30 in the digital camera 10 acquires the information useful in assuming the possibility of red-eye occurrence such as electronic flash information indicating presence/absence of firing of an electronic flash as mentioned above and records the acquired information on the Exif tag appended to the image data.

In step 110, the digital camera 10 is connected to the printer 12 in order to output the photographed image as a print.

In step 120, the sharing determination unit 28 of the digital camera 10 determines how the preprocessing, red-eye detection and red-eye correction are to be shared in accordance with the throughput and state of each device at that time. In this case, the sharing determination unit 46 of the printer 12 may acquire necessary information to determine the sharing.

In step 130, once the sharing is determined, the digital camera 10 executes the shared processing and transfers the processed image data to the printer 12 via the interface 38.

In step 140, the printer 12 executes shared processing on the received image data.

There are two methods for sharing the processing. In a first sharing method, the preprocessing and the red-eye detection are performed on the digital camera 10 side whereas the red-eye correction on the printer 12 side. In a second sharing method, the preprocessing is only performed on the digital camera 10 side whereas the red-eye detection and the red-eye correction are performed on the printer 12 side.

In the first sharing method, the preprocessing is first performed on each photographed image in the preprocessor 32 of the image processing chip 16 on the digital camera 10. That is, photographing information is used to select an image (frame) which could include red-eye. An image selected as one which could include red-eye is given a sign indicating that this is the selected image.

Next, the image selected by the method described above is only subjected to the automatic red-eye detection in the red-eye detecting section 34. When positions and number of red eyes in an image are detected as a result of the red-eye detection, information on the positions and number of red eyes is attached to the image data and transferred from the interface 38 to the printer 12 via the serial bus 14.

The printer 12 temporarily stores the transferred image data in the image memory 44 via the interface 42. Based on an instruction from the sharing determination unit 28 of the digital camera 10, the printer 12 transfers the image data from the image memory 44 to the red-eye correcting section 52 of the image processing chip 18 and the transferred image data is then subjected to the automatic red-eye correction in the red-eye correcting section 52. To the transferred image data is attached the data (signs) indicating the positions and number of red eyes in the image of interest. The red-eye correcting section 52 performs the automatic red-eye correction based on the attached data. The red-eye correction may be performed by any known methods.

In the first sharing method, the preprocessing and the red-eye detection that requires a lot of time are performed on the digital camera 10 side. Therefore, it is only necessary to perform the red-eye correction on the printer 12 side, which allows the processing time on the printer 12 side to be shortened.

However, the load on the CPU on the digital camera 10 side is heavy, leading to the increase in processing time. It is thus necessary to mount a high-performance CPU on the digital camera 10.

In the second sharing method, the preprocessing is only performed on each photographed image in the preprocessor 32 of the image processing chip 16 on the digital camera 10 side.

The preprocessor 32 selects an image having a possibility of red-eye occurrence and transfers the image data to the printer 12 together with the information indicating the red-eye possibility.

When the printer 12 receives the image data, the image in which the possibility of red-eye occurrence was indicated is only subjected to the red-eye detection and the red-eye correction in the red-eye detecting section 50 and the red-eye correcting section 52 of the image processing chip 18, respectively.

In the second sharing method, the preprocessing is only performed on the digital camera 10 side. Therefore, the load on the digital camera 10 is light and the preprocessor 32 can perform the preprocessing even during the outputting of image data from the interface 38 to the printer 12, which ensures efficient processing.

However, it takes a lot of time for the printer 12 to perform the red-eye detection.

In step 150, after the red-eye processing has been performed by any of the first and second sharing methods, the processed image data is converted to data for print output in the image output unit 54 and the converted data is output as a red-eye-corrected print.

According to this embodiment in which the digital camera 10 and the printer 12 are provided with the image processing chips 16 and 18, respectively, so that the red-eye processing can be shared therebetween, the respective image processing devices can be efficiently used and the time required for the red-eye processing can be made shorter than before.

A second embodiment of the invention is described below.

Figure 4:
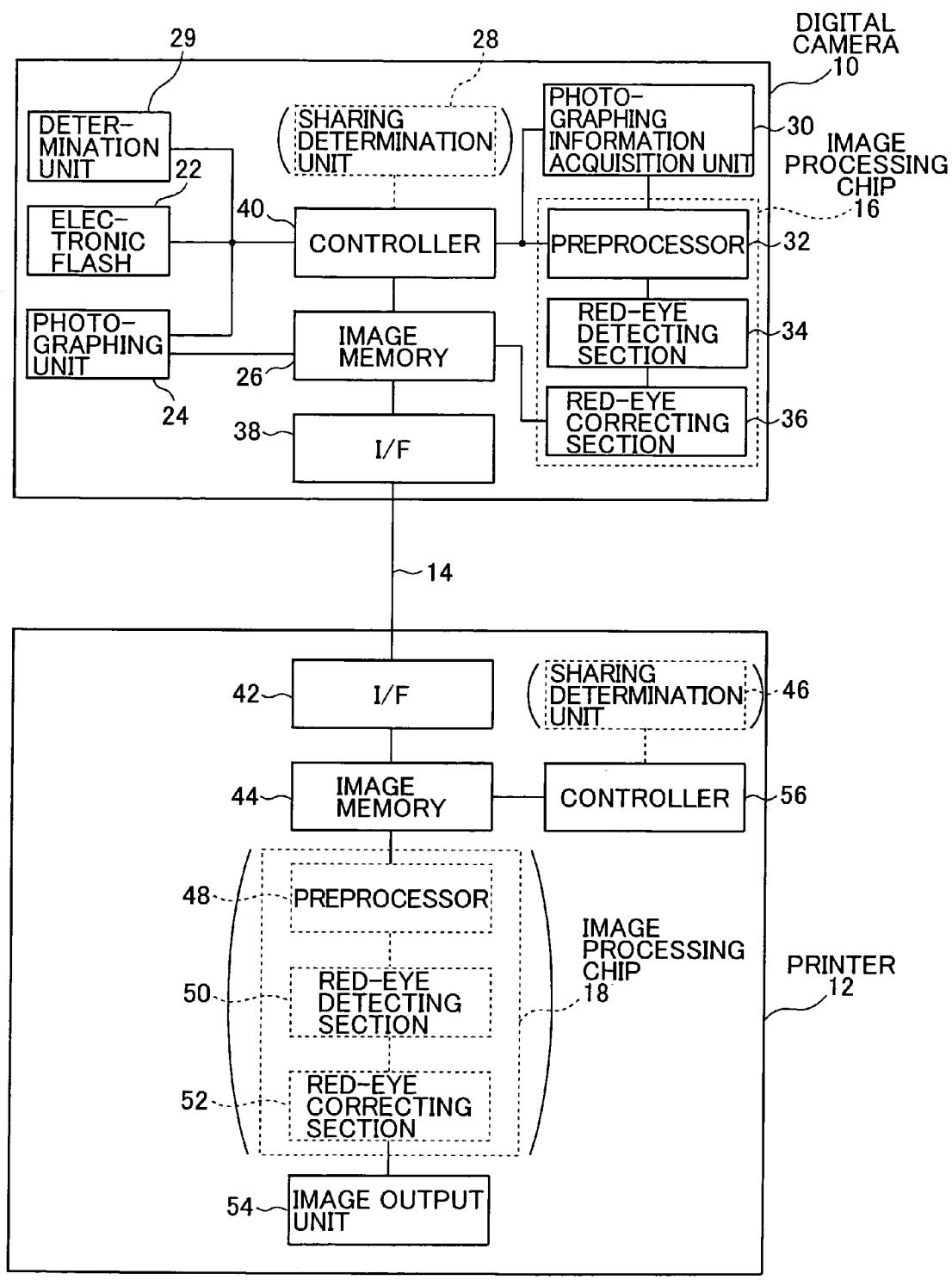
FIG. 4 is a block diagram schematically showing the structure of an image processing system according to a second embodiment of the invention.

FIG. 4 schematically shows the structure of an image processing system according to a second embodiment of the invention. As shown in FIG. 4, in the image processing system according to this embodiment, a digital camera 10 and a printer 12 are interconnected via a serial bus 14 as in the first embodiment mentioned earlier. The second embodiment differs from the first embodiment in that only the digital camera 10 includes an image processing chip 16 and the printer 12 does not necessarily include an image processing chip 18.

Another difference is that the digital camera 10 includes a determination unit 29 for determining whether the image processing chip 18 is mounted on the printer 12 and does not necessarily include a sharing determination unit 28 for determining the sharing of processing.

The determination unit 29 determines whether the printer 12 includes the image processing chip 18. When the printer 12 does not include the image processing chip 18, it is determined that the preprocessing and the red-eye processing including red-eye detection and red-eye correction should be performed on the digital camera 10 side.

Other components in this embodiment are the same as those in the first embodiment so that the detailed description is omitted.

Figure 5:
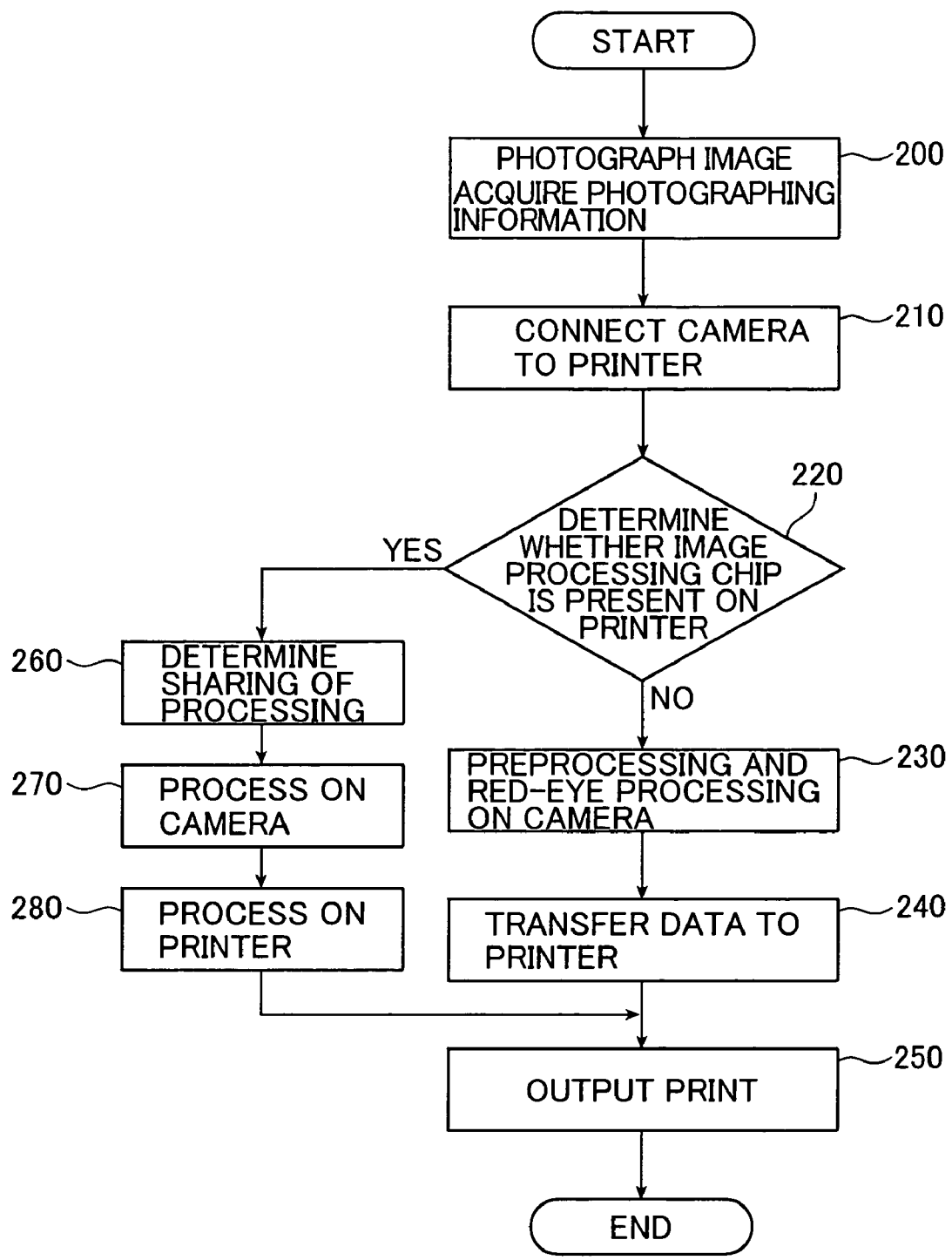
FIG. 5 is a flowchart showing the operation of the second embodiment of the invention.

FIG. 5 is a flowchart showing the operation of the second embodiment of the invention.

The operation of the second embodiment is described below referring to the flowchart of FIG. 5.

In step 200 in FIG. 5, a person as a subject is photographed with the digital camera 10 to acquire photographing information.

In step 210, the digital camera 10 and the printer 12 are interconnected via the serial bus 14.

In step 220, the determination unit 29 of the digital camera 10 determines whether the printer 12 includes the image processing chip 18. As a result of the determination, when the printer 12 does not include the image processing chip 18, the operation proceeds to step 230, where the image processing chip 16 on the digital camera 10 automatically performs the preprocessing, red-eye detection and red-eye correction.

In step 240, the image data which has undergone the red-eye correction and the other image processing is transferred to the printer 12. When the image data which has undergone the red-eye processing and which has no trace of red-eye is received in the printer 12, the image output unit 54 converts the received image data to data for print output and outputs the converted data as a print.

When it is determined in step 220 that printer 12 includes the image processing chip 18, the operation proceeds to step 260, where the sharing of the processing between the digital camera 10 and the printer 12 is determined for subsequent shared processing, as in the first embodiment.

It is assumed that the digital camera 10 includes the sharing determination unit 28. In step 260, the sharing determination unit 28 determines how the processing is to be shared, as in the first embodiment. Processing on the digital camera 10 and processing on the printer 12 are performed in steps 270 and 280, respectively. In step 250, a print is output from the image output unit 54 of the printer 12.

According to this embodiment, when the printer 12 does not include the image processing chip 18, the red-eye processing is all performed on the digital camera 10 side. Therefore, the printer 12 has no load and the digital camera 10 in this embodiment can be connected to any printer.

On the other hand, the load on the digital camera 10 is heavy.

A third embodiment of the invention is described below.

Figure 6:
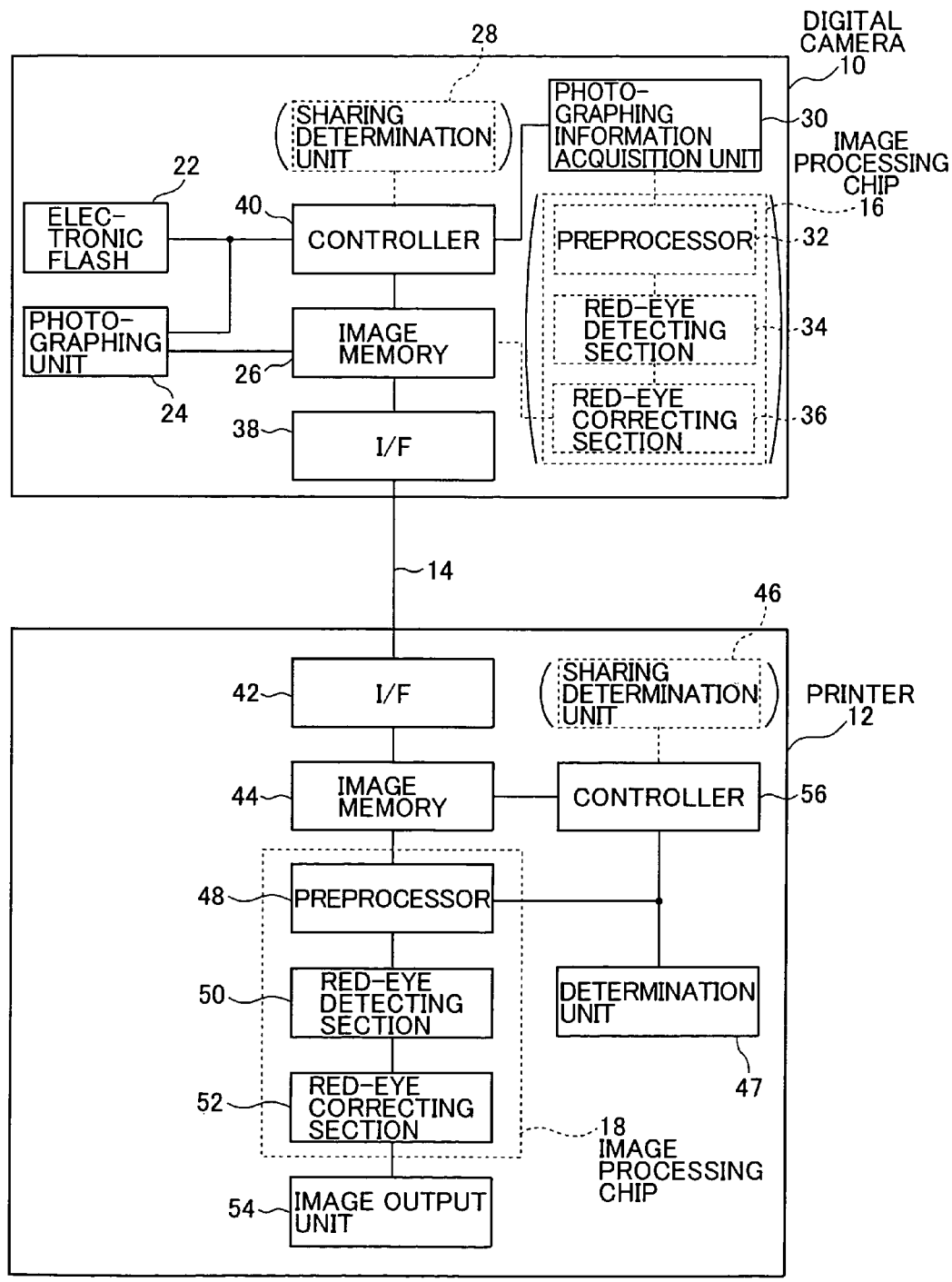
FIG. 6 is a block diagram schematically showing the structure of an image processing system according to a third embodiment of the invention.

FIG. 6 schematically shows the structure of an image processing system according to the third embodiment of the invention. As shown in FIG. 6, in the image processing system according to this embodiment, a digital camera 10 and a printer 12 are interconnected via a serial bus 14, as in the second embodiment mentioned earlier.

Basically in the third embodiment, unlike the second embodiment, only the printer 12 includes an image processing chip 18 and the digital camera 10 does not necessarily include an image processing chip 16.

The printer 12 includes a determination unit 47 for determining whether the image processing chip 16 is mounted on the digital camera 10 and does not necessarily include a sharing determination unit 46 for determining the sharing of processing.

The determination unit 47 determines whether the digital printer 10 includes the image processing chip 16. When the digital printer 10 does not include the image processing chip 16, it is determined that the preprocessing and the red-eye processing including red-eye detection and red-eye correction should be performed on the printer 12 side.

Other components in this embodiment are the same as those in the second embodiment so that the detailed description is omitted.

Figure 7:
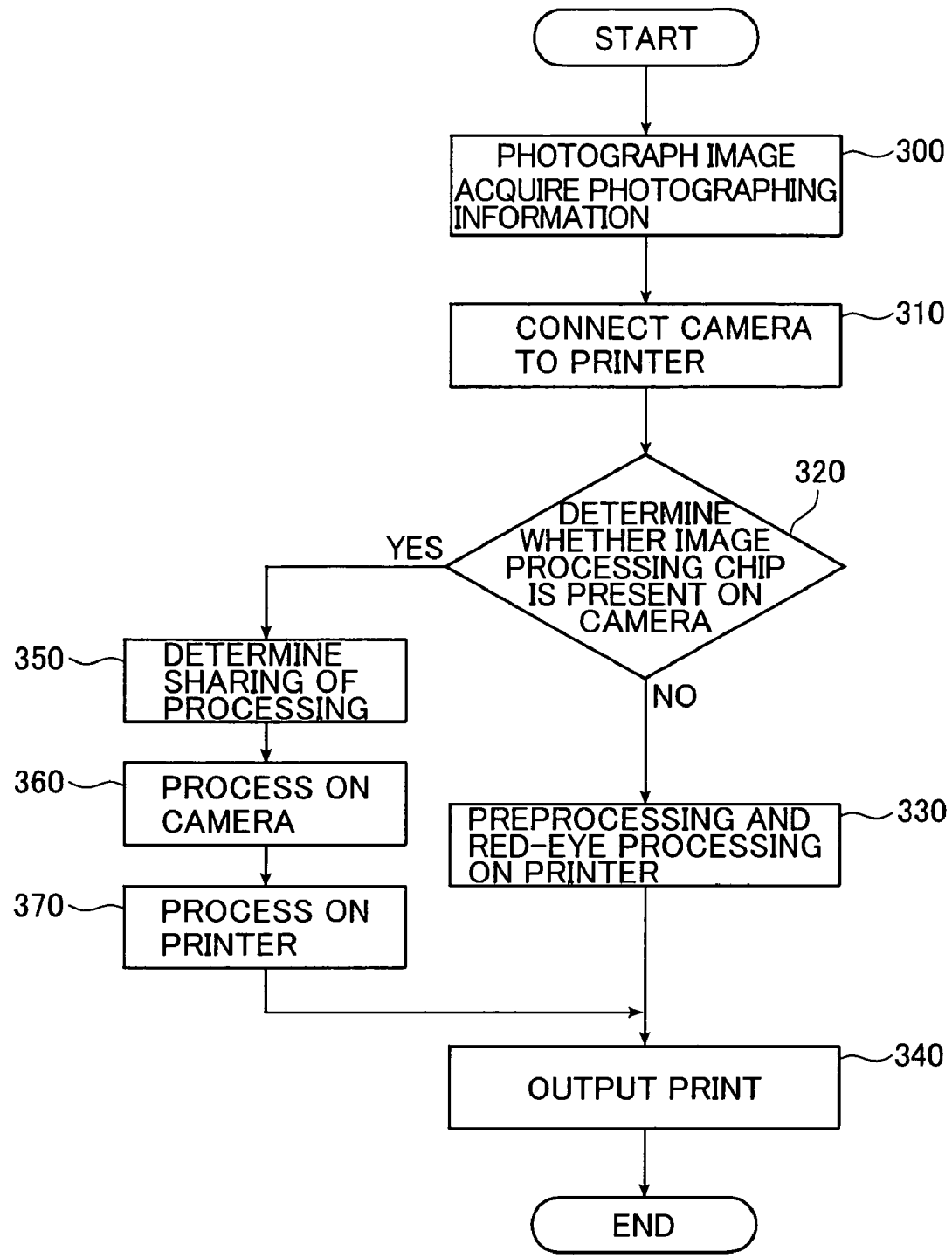
FIG. 7 is a flowchart showing the operation of the third embodiment of the invention.

FIG. 7 is a flowchart showing the operation of the third embodiment of the invention.

The operation of the third embodiment is described below referring to the flowchart of FIG. 7.

In step 300 in FIG. 7, a person as a subject is photographed with the digital camera 10 to acquire photographing information.

Next, in step 310, the digital camera 10 and the printer 12 are interconnected via the serial bus 14.

In step 320, the determination unit 47 of the printer 12 determines whether the digital camera 10 includes the image processing chip 16. The determination unit 47 can specify the camera model from the Exif information attached to the data of the image photographed with the digital camera 10 and switches the control between the processing only by the image processing chip 18 on the printer 12 side and the processing in coordination with the digital camera 10, by the LUT for use in determining whether the image processing chip 16 is mounted on the digital camera 10 based on the camera model. As a result of the determination in step 320, when the digital camera 10 does not include the image processing chip 16, the operation proceeds to step 330, where the image processing chip 18 on the printer 12 side automatically performs the preprocessing, red-eye detection and red-eye correction.

The image data which has undergone the red-eye processing and the other image processing and which has no trace of red-eye is converted to data for print output and the converted data is output as a print.

When it is determined in step 320 that digital camera 10 includes the image processing chip 16, the operation proceeds to step 350, where the sharing of the processing between the digital camera 10 and the printer 12 is determined for subsequent shared processing, as in the first embodiment.

It is assumed that the printer 12 includes the sharing determination unit 46. In step 350, the sharing determination unit 46 determines how the processing is to be shared. Processing on the digital camera 10 and processing on the printer 12 are performed in steps 360 and 370, respectively. In step 340, a print is output from the image output unit 54 of the printer 12.

According to this embodiment, when the digital camera 10 does not include the image processing chip 16, the red-eye processing is all performed on the printer 12 side. Therefore, the digital camera 10 has no load and the printer 12 in this embodiment can be connected to any digital camera.

On the other hand, the load on the printer 12 is heavy.

As mentioned above, according to the embodiments of the invention, by arranging in one of a digital camera and a printer or both, means for determining whether an image processing chip is included therein, processing can be performed in a shared manner and the respective image processing chips can be efficiently used for processing.

When an image processing chip is only mounted on a printer, optimum control is possible to assign all processing related to red-eye to the image processing chip on the printer side. In this case, a digital camera does not perform red-eye processing. Thus, any digital camera can be connected to this printer.

On the other hand, when an image processing chip is only mounted on a digital camera, optimum control is possible to assign all processing related to red-eye to the image processing chip on the digital camera side. In this case, a printer does not perform red-eye processing. Thus, any printer can be connected to this digital camera.

Efficient control of the image processing chips as described above allows the time required for the red-eye processing to be made shorter than before.

As described hereinabove, red-eye processing is performed using an image processing chip having red-eye processing function and mounted on a printer, for example, in direct printing where a digital camera and the printer are directly interconnected to output a print. Even when red-eye occurs in an image photographed with the digital camera, the red-eye is automatically processed using the image processing chip in the printer and a print having no trace of red-eye is output. A customer can obtain a satisfactory high-quality image.

Further, when an image processing chip is mounted on a digital camera, even if red-eye occurs in an image which was photographed with the digital camera but is not processed yet, red-eye correction is automatically performed using the image processing chip in the digital camera prior to outputting outside, whereby a high-quality image having no trace of red-eye can be obtained.

Even if red-eye occurs, its automatic correction is possible. Therefore, restrictions on the positional relation between an electronic flash and a lens are reduced in the design of a digital camera, which enables further downsizing of the digital camera.

While the image processor and the image processing system according to the invention have been detailed, the invention is not limited to the foregoing embodiments and various changes or modifications may be made without departing from the spirit and scope thereof.

As described hereinabove, according to the invention, in the case where an image input apparatus and an image output apparatus are directly interconnected and a photographed image is output from the image output apparatus without using a PC, red-eye processing can be efficiently performed, for example by mounting image processing means having red-eye processing function in one of the image input apparatus and the image output apparatus or both and optimally controlling the processing by the image processing means.

What is claimed is:

1. An image processing system comprising:
    a first image processor equipped with an image input function; and
    a second image processor equipped with an image output function, wherein
    both of said first image processor and said second image processor can transfer image data to each other, and comprise image processing means for performing predetermined image processing on said image data using photographing information when photographing to acquire said image data, and
    at least one of said first image processor and said second image processor comprises means for determining the sharing of preprocessing and said predetermined image processing between said first image processor and said second image processor, and wherein
    the means for determining the sharing of said preprocessing and said predetermined image processing allocates said preprocessing, red-eye detection and red-eye correction between said first image processor and said second image processor on a basis of a throughput and state of said first image processor and said second image processor.

2. The image processing system according to claim 1, wherein said predetermined image processing is red-eye correction processing and said preprocessing is processing for selecting image data of an image which is expected to include red-eye from said image data.

3. The image processing system according to claim 1, wherein said photographing information comprises electronic flash information which indicates a presence of firing of an electronic flash.

* * * * *